(12) United States Patent
Yablochnikov

(10) Patent No.: US 6,908,023 B2
(45) Date of Patent: Jun. 21, 2005

(54) APPARATUS FOR SECURING A YOKE TO A TUBE USING MAGNETIC PULSE WELDING TECHNIQUES

(75) Inventor: Boris A. Yablochnikov, Toledo, OH (US)

(73) Assignee: Torque-Traction Technologies, Inc., Holland, OH (US)

( * ) Notice: Subject to any disclaimer, the term of this patent is extended or adjusted under 35 U.S.C. 154(b) by 128 days.

(21) Appl. No.: 10/382,110

(22) Filed: Mar. 5, 2003

(65) Prior Publication Data

US 2003/0218051 A1 Nov. 27, 2003

Related U.S. Application Data

(60) Provisional application No. 60/361,938, filed on Mar. 6, 2002.

(51) Int. Cl.[7] ............................................... B23K 31/00
(52) U.S. Cl. ........................................................ 228/115
(58) Field of Search ............................... 228/115, 212; 219/600–607, 615–617

(56) References Cited

U.S. PATENT DOCUMENTS

| | | |
|---|---|---|
| 2,341,084 A | 2/1944 | Dodge |
| 2,478,890 A | 8/1949 | Barager |
| 3,092,165 A | 6/1963 | Harvey |
| 3,214,511 A | 10/1965 | Franklin |
| 3,417,456 A | 12/1968 | Carlson |
| 3,520,049 A | 7/1970 | Lysenko et al. |
| 3,528,596 A | 9/1970 | Carlson |
| 3,961,739 A | 6/1976 | Leftheris |
| 3,992,120 A | 11/1976 | Recker |
| 4,067,216 A | 1/1978 | Khimenko et al. |
| 4,129,846 A | 12/1978 | Yablochnikov |
| 4,469,356 A | 9/1984 | Duret et al. |
| 4,504,714 A | 3/1985 | Katzenstein |
| 4,513,188 A | 4/1985 | Katzenstein |

(Continued)

FOREIGN PATENT DOCUMENTS

| | | | |
|---|---|---|---|
| JP | 02004034154 A | * | 2/2004 |
| JP | 02004034155 A | * | 2/2004 |
| JP | 02004130384 A | * | 4/2004 |

OTHER PUBLICATIONS

Yablochnikov, B., "Apparatus for Magnetic Pulse Welding Large Diameter Thin–Walled Pipes", AVT. Svarka, No. 4, pp. 48–51, 58, 1983.

(Continued)

*Primary Examiner*—Kiley S. Stoner
(74) *Attorney, Agent, or Firm*—MacMillan, Sobanski & Todd, LLC

(57) ABSTRACT

An apparatus for supporting a workpiece, such as a yoke having a body portion and a pair of opposed yoke arms, during a magnetic pulse welding operation includes a lower jaw, an upper jaw, and a support pin extending therebetween. During the magnetic pulse welding operation, the lower and upper jaws of the support apparatus engage the opposed yoke arms, and the support pin extends through respective openings formed through the opposed yoke arms. The support apparatus can also include a counter die that is disposed between the lower jaw and the upper jaw and has an arcuate recess formed therein that receives the outer portions of the opposed yoke arms therein. Lastly, the support apparatus can further include a pair of positioning rails that engage the body portion of the yoke. As a result, the support apparatus prevents deformation of the opposed yoke arms and absorbs shock waves that can be propagated through the yoke during the magnetic pulse welding operation.

9 Claims, 4 Drawing Sheets

U.S. PATENT DOCUMENTS

| | | | |
|---|---|---|---|
| 4,523,872 | A | 6/1985 | Arena et al. |
| 4,551,118 | A | 11/1985 | Spisz |
| 4,702,543 | A | 10/1987 | Hager |
| 4,789,094 | A | 12/1988 | Chudakov |
| 4,807,351 | A | 2/1989 | Berg et al. |
| 4,930,204 | A | 6/1990 | Schurter |
| 4,990,732 | A | 2/1991 | Dudko et al. |
| 5,222,915 | A | 6/1993 | Petrzelka et al. |
| 5,318,374 | A | 6/1994 | Rumberger |
| 5,716,276 | A | 2/1998 | Mangas et al. |
| 5,813,264 | A | 9/1998 | Steingroever |
| 5,981,921 | A | 11/1999 | Yablochnikov |
| 6,348,670 | B2 * | 2/2002 | Kistersky et al. ...... 219/121.45 |
| 6,367,680 | B1 * | 4/2002 | Duggan ...................... 228/107 |
| 6,379,254 | B1 * | 4/2002 | Yablochnikov ............. 464/134 |
| 6,400,538 | B1 * | 6/2002 | Kistersky et al. ............. 361/17 |
| 6,548,791 | B2 * | 4/2003 | Kistersky et al. ........... 219/617 |
| 2002/0003159 | A1 | 1/2002 | Gabbianelli et al. |
| 2003/0218051 | A1 * | 11/2003 | Yablochnikov ............. 228/107 |

OTHER PUBLICATIONS

Kojima et al., "Effect of Collision Angle on the Result of Electromagnetic Welding of Aluminum", Transactions of the Japan Welding Society, vol. 20, No. 2, pp. 36–42, Oct., 1989.

Karpouhin et al., "Magnetic Pulse Welding", International Conference on the Joining of Materials, Helsingor, Denmark, pp. 241–245, May, 1991.

Hardwick et al., "Some More Recent Advances in Cladding Technology", Ninth Annual Conference on High Energy Reaction on Materials, Novosibirsk, Russia, pp. 271–274, Aug., 1986.

Noland et al., "High–Velocity Metal Working", Office of Technology Utilization, NASA, Washington, D.C., pp. 1–29, 179, 1967.

* cited by examiner

APPARATUS FOR SECURING A YOKE TO A TUBE USING MAGNETIC PULSE WELDING TECHNIQUES

CROSS REFERENCE TO RELATED APPLICATION

This application claims the benefit of U.S. Provisional Application Ser. No. 60/361,938, filed Mar. 6, 2002, the disclosure of which is incorporated herein by reference.

BACKGROUND OF THE INVENTION

This invention relates in general to the use of magnetic pulse welding techniques to secure two metallic components together, such as a yoke and a driveshaft tube in a vehicular driveshaft assembly. In particular, this invention relates to an improved apparatus that minimizes the amount of undesirable distortions that can result in a yoke or similar end fitting when a driveshaft tube is secured thereto by means of such a magnetic pulse welding operation.

In most land vehicles in use today, a drive train system is provided for transmitting rotational power from an output shaft of an engine/transmission assembly to an input shaft of an axle assembly so as to rotatably drive one or more wheels of the vehicle. To accomplish this, a typical vehicular drive train assembly includes a hollow cylindrical driveshaft tube having first and second end fittings (such as tube yokes) secured to the opposed ends thereof. The first end fitting forms a portion of a first universal joint, which provides a rotatable driving connection from the output shaft of the engine/transmission assembly to the driveshaft tube while accommodating a limited amount of angular misalignment between the rotational axes of these two shafts. Similarly, the second end fitting forms a portion of a second universal joint, which provides a rotatable driving connection from the driveshaft tube to the input shaft of the axle assembly while accommodating a limited amount of angular misalignment between the rotational axes of these two shafts.

In vehicular driveshaft assemblies of this general type, it is usually necessary to permanently secure the first and second end fittings to the ends of the driveshaft tube. Traditionally, conventional welding techniques have been used to permanently join the first and second end fittings to the ends of the driveshaft tube. As is well known, conventional welding techniques involve the application of heat to localized areas of two metallic members, which results in a coalescence of the two metallic members. Such conventional welding techniques may or may not be performed with the application of pressure, and may or may not include the use of a filler metal. Although conventional welding techniques have functioned satisfactorily in the past, there are some drawbacks to the use thereof in joining the first and second end fittings to the ends of the driveshaft tube. First, as noted above, conventional welding techniques involve the application of heat to localized areas of the two metallic members. This application of heat can cause undesirable distortions and weaknesses to be introduced into the metallic components. Second, while conventional welding techniques are well suited for joining components that are formed from similar metallic materials, it has been found to be somewhat more difficult to adapt them for use in joining components formed from dissimilar metallic materials. Third, conventional welding techniques are not easily adapted for joining components that have different gauge thicknesses. Inasmuch as the production of vehicular driveshaft assemblies is usually a high volume process, it would be desirable to provide an improved method for permanently joining these metallic components together in a manner that avoids the drawbacks of conventional welding techniques.

Magnetic pulse welding is an alternative process that has been proposed to secure the first and second end fittings to the opposed ends of the driveshaft tube. To accomplish this, a hollow driveshaft tube having an end portion and an end fitting having a neck portion are initially provided. The end portion of the driveshaft tube can be hollow to allow the neck portion of the end fitting to be disposed co-axially therein. Alternatively, the neck portion of the end fitting can be hollow to allow the end portion of the driveshaft tube to be disposed telescopically therein. In either event, an annular gap is provided between the end of the driveshaft tube and the neck portion of the end fitting. Then, an electrical inductor is provided concentrically about or within the co-axially overlapping portions of the driveshaft tube and the end fitting. The inductor is energized to generate a magnetic field that either collapses the outer member inwardly into engagement with the inner member or expands the inner member outwardly into engagement with the outer member. In either event, the high velocity impact of the two members, as well as the large pressures exerted thereon, cause them to become permanently joined together.

A typical end fitting includes a body portion having a pair of opposed yoke arms that extend therefrom in a first axial direction. A pair of aligned openings are formed through the yoke arms and are adapted to receive conventional bearing cups of the universal joint cross therein. A generally hollow neck portion extends axially in a second axial direction from the body portion. To perform the magnetic pulse welding operation, an end portion of the driveshaft tube is installed onto co-axially about the neck portion of the end fitting. When the driveshaft tube and the end fitting are assembled in this manner, an annular gap or space is defined between the inner surface of the end portion of the driveshaft tube and outer surface of the neck portion of the end fitting. An electrical inductor is then disposed about the assembly of the driveshaft tube and the end fitting. The inductor is energized to generate an immense and momentary electromagnetic field about the end portion of the driveshaft tube. This electromagnetic field exerts a very large force on the outer surface of the end portion of the driveshaft tube, causing it to collapse inwardly at a high velocity onto the neck portion of the end fitting. The resulting impact of the inner surface of the end portion of the driveshaft tube with the outer surface of the neck portion of the end fitting causes a weld or molecular bond to occur therebetween.

Unfortunately, it has been found that the high velocity impact of the end portion of the driveshaft tube onto the neck portion of the end fitting during the magnetic pulse welding operation can, in some instances, cause the yoke arms of the end fitting to be permanently deflected relative to one another. For example, if the end portion of the driveshaft tube is collapsed upon the neck portion of the end fitting, the inward deformation of the neck portion can cause the yoke arms on the other end of the end fitting to spread outwardly apart from one another. Also, the shock wave propagated through the end fitting as a result of this impact can slightly enlarge the dimensions of the openings formed through the yoke arms. These events are particularly likely to occur when the end fitting is formed from a relatively lightweight material, such as an alloy of aluminum. Such deflections of the yoke arms are undesirable because they can result in the misalignment of the respective openings formed therethrough. When the openings formed through the yoke arms are not precisely aligned, it may be relatively difficult to properly install the remaining portions of the universal joint thereon and to balance the universal joint for rotation. Thus, it would be desirable to provide an improved apparatus that minimizes the amount of undesirable deflections that can result in a yoke or similar end fitting when a driveshaft tube is secured thereto by a magnetic pulse welding operation.

SUMMARY OF THE INVENTION

This invention relates to an improved apparatus that minimizes the amount of undesirable distortions that can result in a yoke or similar end fitting when a driveshaft tube is secured thereto by a magnetic pulse welding operation. The support apparatus includes a lower jaw, an upper jaw, and a support pin extending therebetween. During the magnetic pulse welding operation, the lower and upper jaws of the support apparatus engage the opposed yoke arms, and the support pin extends through respective openings formed through the opposed yoke arms. The support apparatus can also include a counter die that is disposed between the lower jaw and the upper jaw and has an arcuate recess formed therein that receives the outer portions of the opposed yoke arms therein. Lastly, the support apparatus can further include a pair of positioning rails that engage the body portion of the yoke. As a result, the support apparatus prevents deformation of the opposed yoke arms and absorbs shock waves that can be propagated through the yoke during the magnetic pulse welding operation.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
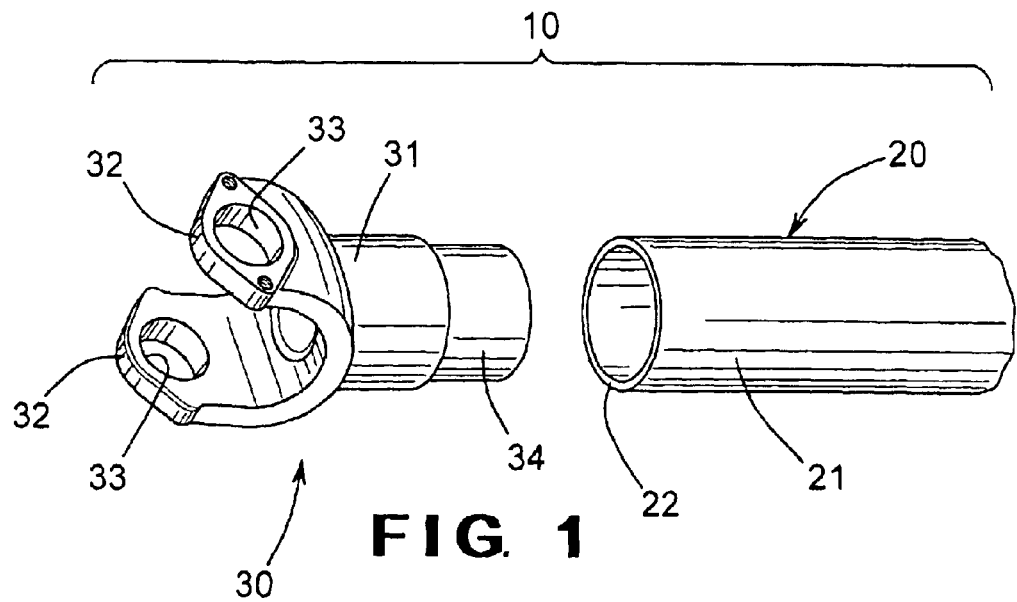
FIG. 1 is an exploded perspective view of an end fitting and a driveshaft tube shown prior to being assembled and secured together by means of a magnetic pulse welding operation in accordance with this invention.
Figure 2:
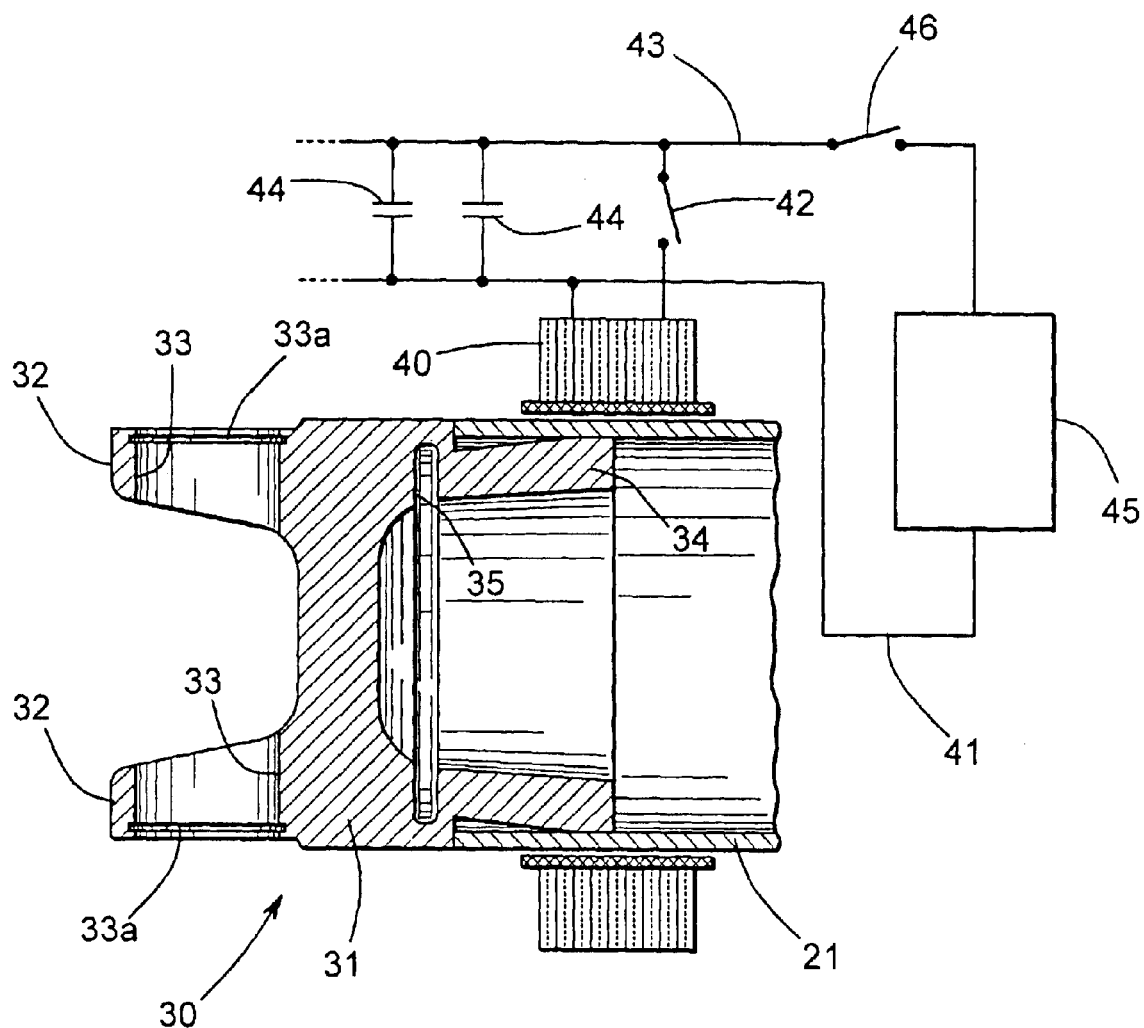
FIG. 2 is an enlarged sectional elevational view of the end fitting and the driveshaft tube illustrated in FIG. 1 shown assembled and disposed within an inductor for performing the magnetic pulse welding operation.

Referring now to the drawings, there is illustrated in FIGS. 1 and 2 a portion of a vehicular driveshaft assembly 10 that includes a driveshaft tube, indicated generally at 20, and a first embodiment of an end fitting, indicated generally at 30. Although this invention will be described and illustrated in the context of securing an end fitting to a driveshaft tube to form a portion of a vehicular driveshaft assembly, it will be appreciated that the method of this invention can be used to secure any two metallic components together for any desired purpose or application.

The illustrated driveshaft tube 20 is generally hollow and cylindrical in shape and can be formed from any desired metallic material, such as 6061 T6 aluminum alloy, for example. Preferably, the driveshaft tube 20 has an outer surface that defines a substantially constant outer diameter and an inner surface that defines a substantially constant inner diameter. Thus, the illustrated driveshaft tube 20 has a substantially cylindrical and uniform wall thickness, although such is not required. The driveshaft tube 20 has an end portion 21 that terminates at an end surface 22.

The illustrated end fitting 30 is a tube yoke formed from a metallic material that can be either the same as or different from the metallic material used to form the driveshaft tube 20, such steel or an alloy of aluminum, for example. The end fitting 30 includes a body portion 31 having a pair of opposed yoke arms 32 that extend therefrom in a first axial direction. A pair of aligned openings 33 are formed through the yoke arms 32 and are adapted to receive conventional bearing cups (not shown) of a universal joint cross therein. If desired, an annular groove 33a (see FIG. 2) can be formed within each of the openings 33 to facilitate retention of the bearing cups therein in a known manner by means of respective snap rings (not shown). A generally hollow neck portion 34 extends axially in a second axial direction from the body portion 31. The structure of the neck portion 34 is described in detail in co-pending application Ser. No. 60/362,215, filed Mar. 6, 2002, which is owned by the assignee of this invention. The disclosure of that application is incorporated herein by reference. If desired, an annular groove 35 (see FIG. 2) or similar recessed area can be formed on the interior of the end fitting 30. The purpose for this annular groove 35 is explained in detail in co-pending application Ser. No. 60/362,150, filed Mar. 6, 2002, which is also owned by the assignee of this invention. The disclosure of that application is also incorporated herein by reference.

FIG. 2 also illustrates an inductor 40 disposed about the assembly of the driveshaft tube 20 and the end fitting 30 prior to the performance of a magnetic pulse welding operation for securing the two components together in accordance with the method of this invention. The inductor 40 can be formed having any desired structure, such as that shown and described in U.S. Pat. No. 4,129,846 to Yablochnikov. The disclosure of that patent is incorporated herein by reference. The inductor 40 is connected to a schematically illustrated control circuit for selectively operating same. As shown in FIG. 2, a first end of the inductor 40 is connected to a first electrical conductor 41, while a second end of the inductor 40 is connected through a discharge switch 42 to a second electrical conductor 43. A plurality of high voltage capacitors 44 or similar energy storage devices are connected between the first and second electrical conductors 41 and 43. The first electrical conductor 41 is also connected to a source of electrical energy 45, while the second electrical conductor 43 is connected through a charging switch 46 to the source of electrical energy 45. The structure and operation of the control circuit is described in detail in U.S. Pat. No. 5,981,921 to Yablochnikov, and the disclosure of that patent is also incorporated herein by reference.

The operation of the inductor 40 to perform the magnetic pulse welding operation is well known in the art, and reference is again made to the above-referenced U.S. Pat. No. 5,981,921 to Yablochnikov for a detailed explanation. Briefly, however, the inductor 40 is operated by initially opening the discharge switch 42 and closing the charging switch 46. This allows electrical energy to be transferred from the source of electrical energy 45 to each of the capacitors 44. When the capacitors 44 have been charged to a predetermined voltage, the charging switch 46 is opened. Thereafter, when it is desired to operate the inductor 40, the discharge switch 42 is closed. As a result, a high energy pulse of electrical current flows from the capacitors 44 through the inductor 40, thereby generating an immense and momentary electromagnetic field about the end portion 21 of the driveshaft tube 20. This electromagnetic field exerts a very large force on the outer surface of the end portion 21 of the driveshaft tube 20, causing it to collapse inwardly at a high velocity onto the neck portion 34 of the end fitting 30. The resulting impact of the inner surface of the end portion 21 of the driveshaft tube 20 with the outer surface of the neck portion 34 of the end fitting 30 causes a weld or molecular bond to occur therebetween. The size and location of the weld region will vary with a variety of factors, such as the size of the gap 36, the size, shape, and nature of the metallic materials used to form the driveshaft tube 20 and the end fitting 30, the size and shape of the inductor 40, the angle and velocity of the impact between the end portion 21 of the driveshaft tube 20 and the neck portion 34 of the end fitting 30, and the like.

As discussed above, it has been found that the high velocity impact of the end portion 21 of the driveshaft tube 20 onto the neck portion of a conventional end fitting during the magnetic pulse welding operation can, at least in some instances, cause the yoke arms 32 of the end fitting 30 to be permanently deflected relative to one another. This occurs because the body portion 31 of a conventional end fitting can be plastically deformed as a result of the impact of the end portion 21 of the driveshaft tube 20 on the neck portion 34. This is particularly likely to occur when the end fitting 34 is formed from a relatively lightweight material, such as an alloy of aluminum. Also, this high velocity impact can cause shock waves to propagate through the end fitting 30 from the neck portion 34 to the yoke arms 32 that can result in some distortion of the shape of the aligned openings 33 formed therethrough.

To reduce or prevent this from occurring, an apparatus, indicated generally at 50, is provided for supporting the end fitting 30 during the magnetic pulse welding operation. The structure of the support apparatus 50 is illustrated in detail in FIGS. 3, 4, and 5. As shown therein, the support apparatus 50 includes a lower jaw 51 having a bore 51a formed therethrough and an upper jaw 52 having a bore 52a formed therethrough. The lower jaw 51 and the upper jaw 52 are carried on a conventional support device (not shown) for movement relative to one another between an opened position (illustrated in FIG. 3) and a closed position (illustrated in FIG. 5). In the opened position, the lower jaw 51 and the upper jaw 52 are moved apart from one another to allow a workpiece, such as the end fitting 30, to be installed therein or removed therefrom, in the manner described in detail below. In the closed position, the lower jaw 51 and the upper jaw 52 are moved toward one another to engage and support the workpiece, such as the end fitting 30, during the magnetic pulse welding operation. The bores 51a and 52a are preferably co-axially aligned with one another.

The support apparatus 50 also includes a support pin, indicated generally at 53. The illustrated support pin 53 includes an upper portion 53a that is sized to be press fit within the bore 52a formed through the upper jaw 52. However, the support pin 53 can be supported on the upper jaw 52 in any other conventional manner. Regardless, the support pin 53 is supported on the upper jaw 52 for movement therewith relative to the lower jaw 52, as described above. The illustrated support pin 53 also includes a lower portion 53b that is sized to be slightly smaller than the aligned openings 33 formed through the yoke arms 32 of the end fitting 30 and slightly smaller than the bore 51a formed through the lower jaw 51. Thus, the lower portion 53b of the support pin 53 can be moved freely through the aligned openings 33 and through the bore 51a when the lower jaw 51 and the upper jaw 52 are moved from the opened position to the closed position, as described above. If desired, the support pin 53 may have a reduced diameter portion 53c between the upper portion 53a and the lower portion 53b. The purpose of this reduced diameter portion 53c will be explained below. Also, the support pin 53 may have a chamfered end 53d provided on the lower portion 53b thereof to facilitate the insertion of the support pin 53 through such aligned openings 33 and through the bore 51a. Although the invention will be described in the context of the support pin 53 being supported on the upper jaw 52, it will be appreciated that the support pin 53 can be supported on the lower jaw 51 in a similar manner. Alternatively, the support pin 53 need not be supported on either of the jaws 51 and 52, but rather may be supported independently therefrom.

Figure 4:
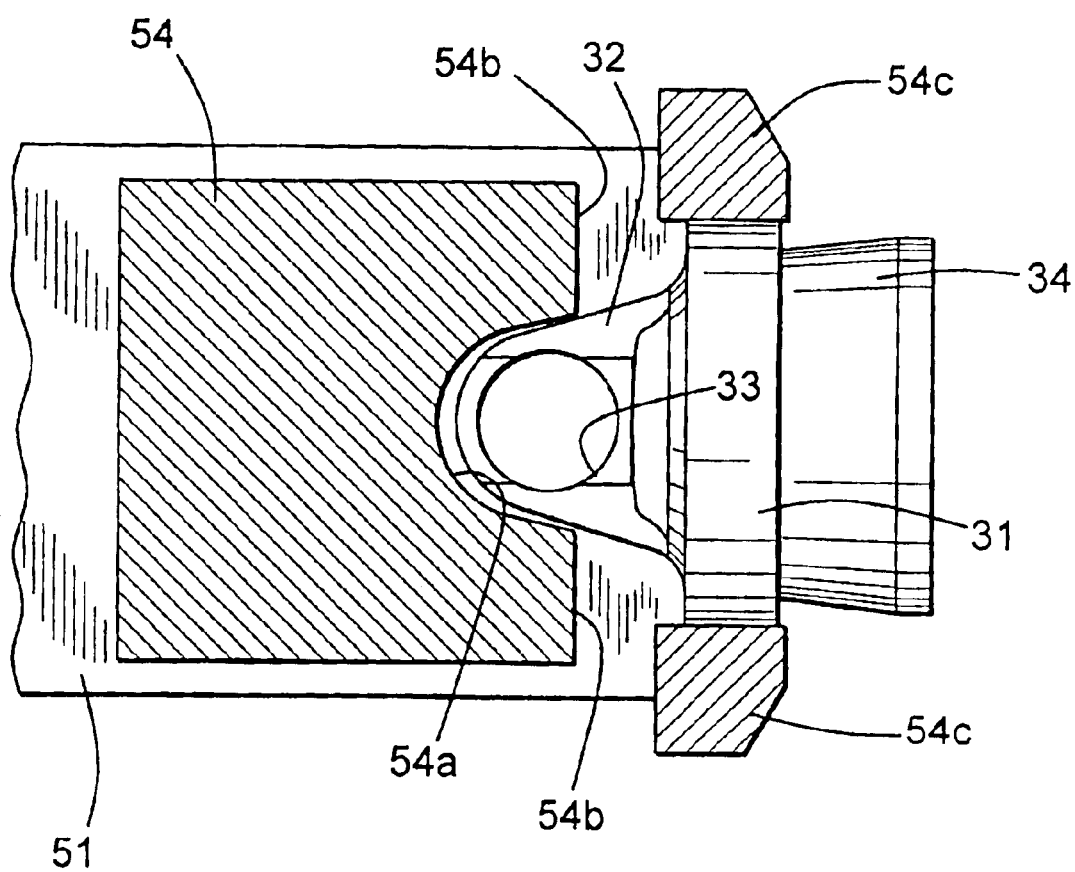
FIG. 4 is a top plan view, partially broken away, of the apparatus for supporting the end fitting during the magnetic pulse welding operation.

The support apparatus 50 further includes a counter die 54 that is disposed between the lower jaw 51 and the upper jaw 52. The counter die 54 has an arcuate recess 54a formed therein that defines a pair of opposed counter die arms 54b. The counter die 54 may also include a pair of upstanding positioning rails 54c (see FIG. 4). If desired, the positioning rails 54c may be provided as separate members from the counter die 54, as shown in FIG. 4. The purpose for the counter die 54, the counter die arms 54b, and the positioning rails 54c will be explained below.

Figure 3:
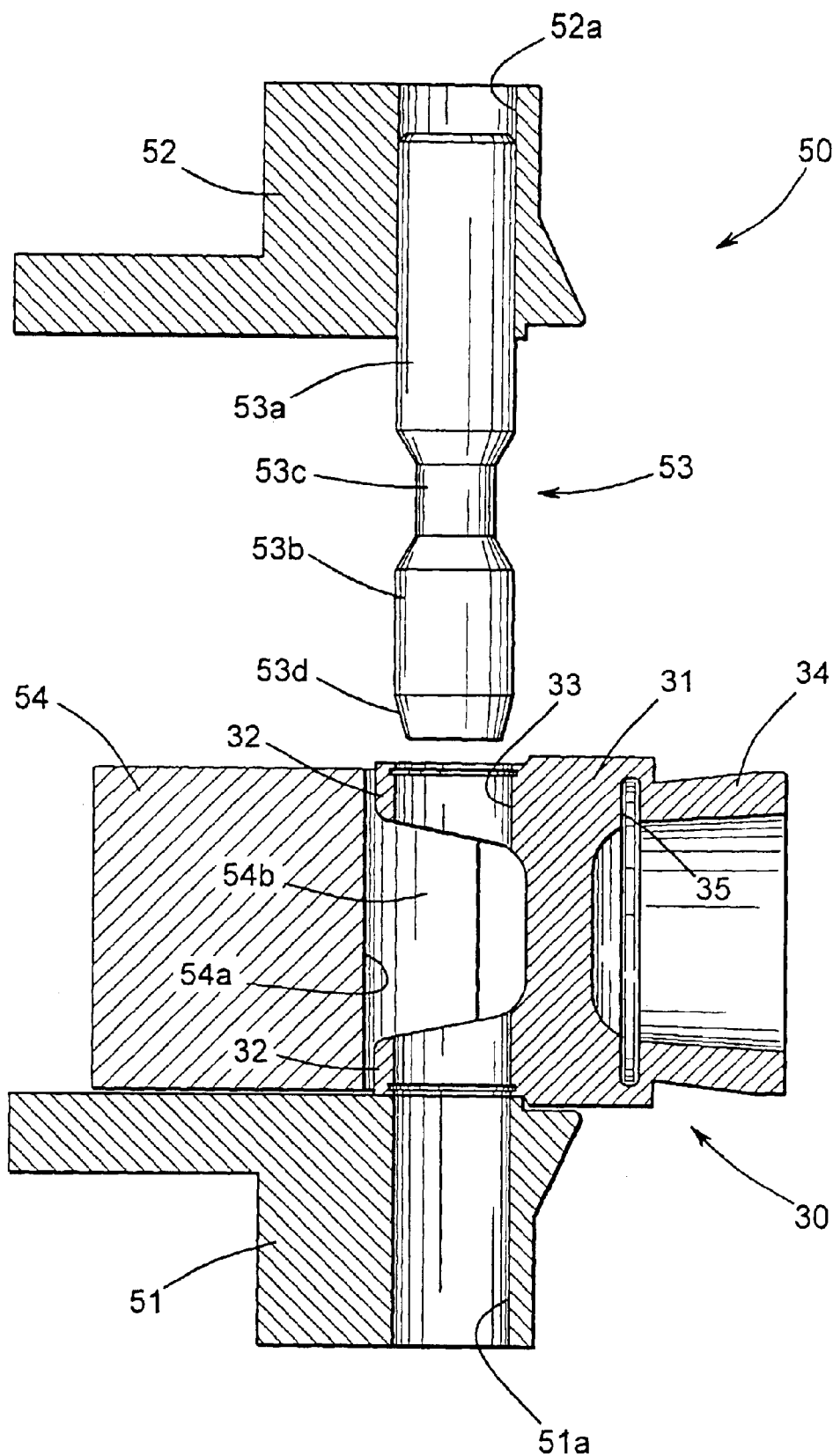
FIG. 3 is an enlarged sectional elevational view of the end fitting illustrated in FIGS. 1 and 2 shown partially installed within an apparatus for supporting the end fitting during the magnetic pulse welding operation.

The use of the support apparatus 50 in the performance of the magnetic pulse welding operation will now be explained. Initially, the lower jaw 51 and the upper jaw 52 of the support apparatus 50 are moved to the opened position illustrated in FIG. 3. Then, an end fitting 30 is loaded into the support apparatus 50 by disposing the end fitting 30 on the lower jaw 51 as shown in FIGS. 3 and 4. When loaded into the support apparatus 50, the lower surface of the lower yoke arm 32 of the end fitting 30 engages the upper surface of the lower jaw 51. Preferably, the openings 33a formed through the yoke arms 33 are aligned, at least approximately, with the bore 51a formed through the lower jaw 51 and the bore 52a formed through the upper jaw 52. At the same time, the body portion 31 of the end fitting 30 engages the positioning rails 54c so as to be positively positioned relative thereto in a lateral direction (i.e., from top to bottom when viewing FIG. 4).

Figure 5:
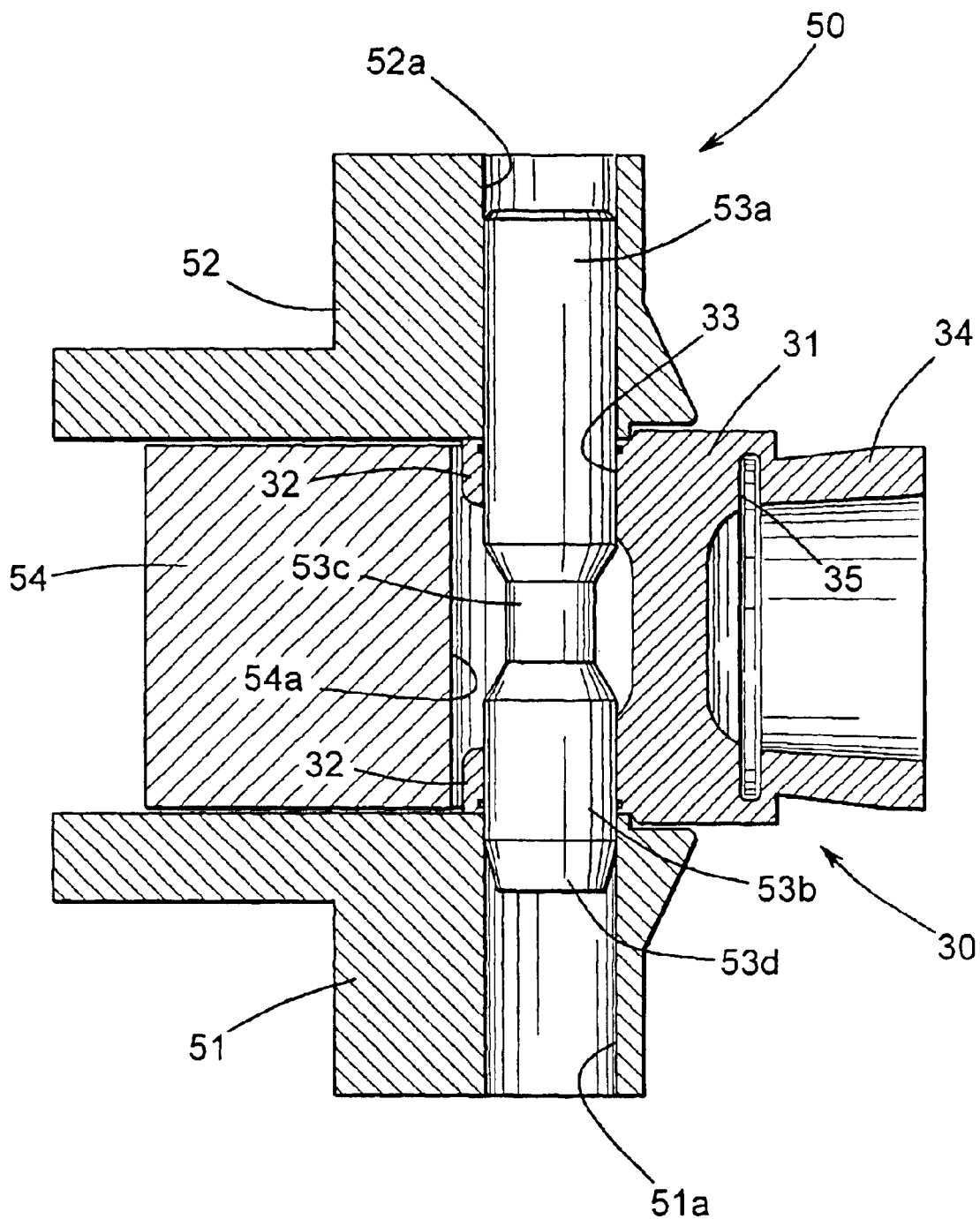
FIG. 5 is an enlarged sectional elevational view similar to FIG. 3 showing the end fitting fully installed within the apparatus for supporting the end fitting during the magnetic pulse welding operation.

Next, the support apparatus 50 is actuated to move the lower jaw 51 and the upper jaw 52 of the support apparatus 50 to the closed position illustrated in FIG. 5. As this occurs, the support pin 53 is moved through the upper opening 33 formed through the upper yoke arm 32 of the end fitting 30, through the lower opening 33 formed through the lower yoke arm 32 of the end fitting 30, and into the bore 51a formed through the lower jaw 51. During such movement, the chamfered end 53d of the support pin 53 accommodates any small amount of misalignment between the two openings 33 and the bore 51a to facilitate the insertion of the support pin 53 therethrough. The support pin 53 is preferably formed from a hardened material such that when it is inserted through the openings 33 of the yoke arms 32, any misalignment therebetween is automatically corrected. Because of the lack of any significant resistance, this initial movement of the jaws 51 and 52 toward the closed position can be accomplished at a relatively fast speed.

When the lower surface of the upper jaw 52 engages the upper surface of the upper yoke arm 32 of the end fitting 30, the support apparatus 50 is in the closed position. Thus, further relative movement of the lower and upper jaws 51 and 52 can be ceased. However, it may be desirable for the support apparatus 50 to exert a pre-loading force against the yoke arms 32 of the end fitting 30 prior to the commencement of the magnetic pulse welding operation. To accomplish this, the support apparatus 50 can be operated such that the lower and upper jaws 51 and 52 slightly compress the yoke arms 32 of the end fitting 30 therebetween. As a result, the yoke arms 32 are slightly flexed inwardly toward one another. The reduced diameter portion 53c of the support pin 53 provides a relatively weakened area therein that can accommodate such flexing of the yoke arms 32. Accordingly, the end fitting 30 is securely engaged and supported by the support apparatus 50 in the axial direction (by means of the support pin 53 extending through the openings of the yoke arms 32), in the lateral direction (by means of the positioning rails 54c engaging the body portion 31 of the end fitting 30), and in the vertical direction (by means of the lower and upper jaws 51 and 52 engaging the body portion 31 of the end fitting 30).

Next, the counter die 54 is actuated to move axially toward the end fitting 30 until the outer portions of the yoke arms 32 are received within the arcuate recess 54a formed therein. As best shown in FIG. 4, the yoke arms 32 of the end fitting 30 engage the opposed counter die arms 54b so as to be positively positioned relative thereto in the axial direction (i.e., from left to right when viewing FIG. 4). The counter die 54 provides additional support in the axial direction for the end fitting 30.

Thereafter, the inductor 40 is energized to perform the magnetic pulse welding operation as described above. As previously discussed, the high velocity impact of the end portion 21 of the driveshaft tube 20 onto the neck portion 34 of the end fitting 30 during the magnetic pulse welding operation can, in some instances, cause the yoke arms 32 of the end fitting 30 to be permanently deflected relative to one another. However, such permanent deflections are reduced or eliminated when the end fitting 30 is engaged and supported by the support apparatus 50 as described above. The support apparatus 50 prevents the inward deformation of the neck portion 34 during the magnetic pulse welding operation from causing the yoke arms 32 on the other end of the end fitting 30 to spread outwardly apart from one another. Also, the support apparatus 50 absorbs the shock wave that is propagated through the end fitting 30 as a result of this impact to reduce or eliminate any enlargement of the dimensions of the openings 33 formed through the yoke arms 32.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of performing a magnetic pulse welding operation to secure a yoke to a metallic component comprising the steps of:

(a) providing a yoke including a body portion and a pair of yoke arms;

(b) providing a metallic component baying an end;

(c) disposing the end of the metallic component in an axially overlapping manner relative to the body portion of the yoke;

(d) supporting the pair of yoke arms in a support apparatus; and (e) performing a magnetic pulse welding operation to secure the end of the metallic component to the body portion of the yoke.

2. The method defined in claim 1 wherein said step (d) is performed by providing a support apparatus including a first jaw that engages a first one of the pair of opposed yoke arms and a second jaw that engages a second one of the pair of opposed yoke arms.

3. The method defined in claim 1 wherein said step (a) is performed by providing the opposed yoke arms with respective openings formed therethrough.

4. The method defined in claim 3 wherein said step (d) is performed by providing a support apparatus including a first jaw that engages a first one of the pair of opposed yoke arms and a second jaw that engages a second one of the pair of opposed yoke arms.

5. The method defined in claim 4 wherein said step (d) is performed by providing the support apparatus with a support pin that extends from the first jaw to the second jaw through the openings formed through the opposed yoke arms.

6. The method defined in claim 5 wherein said step (d) is performed by securing the support pin to one of the first and second jaws.

7. The method defined in claim 5 wherein said step (d) is performed by providing the support pin with a first portion that is secured to the first jaw and extends through the opening formed through the first one of the pair of opposed yoke arms, a second portion that is secured to the second jaw and extends through the opening formed through the second one of the opposed yoke arms, and a reduced dimension portion extending between the first and second portions.

8. The method defined in claim 1 wherein said step (d) is performed by providing a support apparatus with a pair of positioning rails that engage portions of the yoke to provide lateral support during the magnetic pulse welding operation.

9. The method defined in claim 1 wherein said step (d) is performed by providing a support apparatus with a counter die that engages portions of the yoke to provide axial support during the magnetic pulse welding operation.

\* \* \* \* \*

UNITED STATES PATENT AND TRADEMARK OFFICE
CERTIFICATE OF CORRECTION

PATENT NO. : 6,908,023 B2
DATED : June 21, 2005
INVENTOR(S) : Boris A. Yablochnikov It is certified that error appears in the above-identified patent and that said Letters Patent is hereby corrected as shown below:

Column 8,
Line 7, "baying" should be -- having --.

Signed and Sealed this

Thirtieth Day of August, 2005

JON W. DUDAS
*Director of the United States Patent and Trademark Office*